Figure 1:
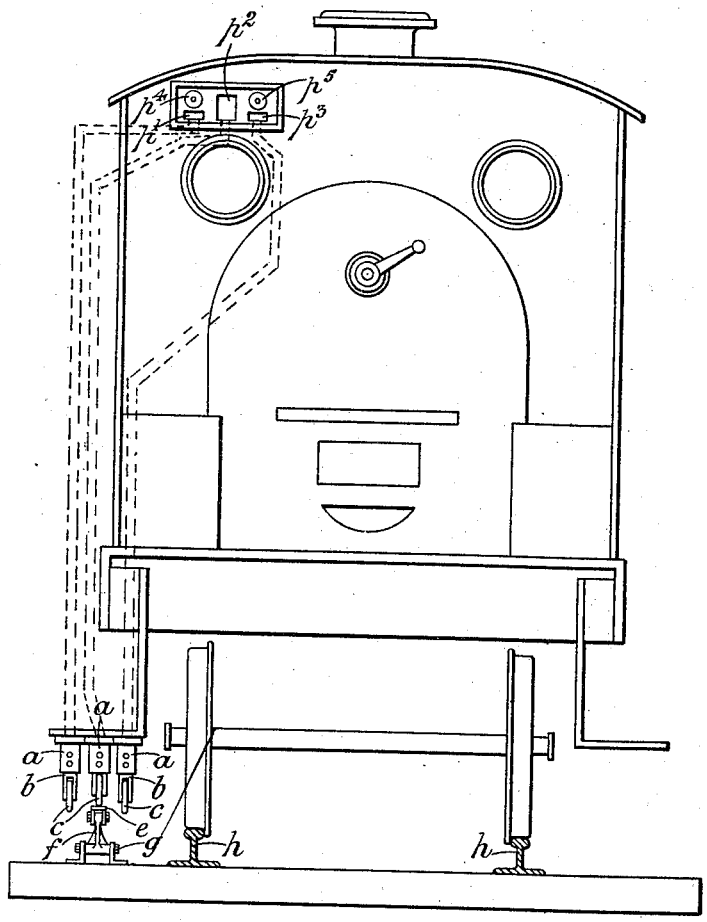

No. 722,109. PATENTED MAR. 3, 1903.
H. J. JEFCOATE.
RAILWAY SIGNALING APPARATUS.
APPLICATION FILED NOV. 24, 1902.
NO MODEL. 3 SHEETS—SHEET 1.

Witnesses
Inventor
Henry J. Jefcoate

No. 722,109. PATENTED MAR. 3, 1903.
H. J. JEFCOATE.
RAILWAY SIGNALING APPARATUS.
APPLICATION FILED NOV. 24, 1902.
NO MODEL. 3 SHEETS—SHEET 2.
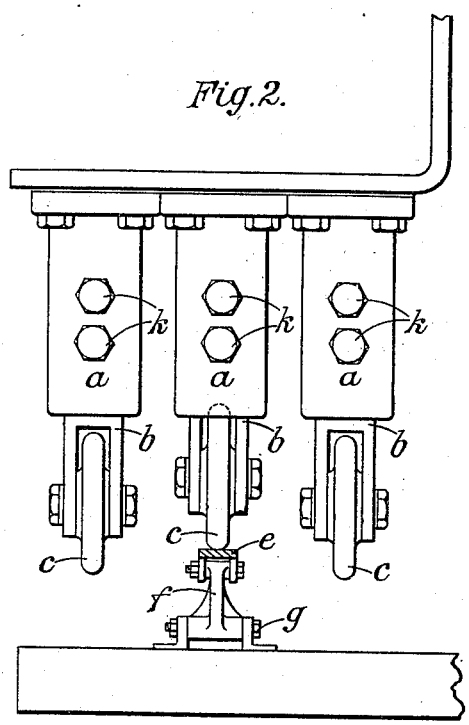
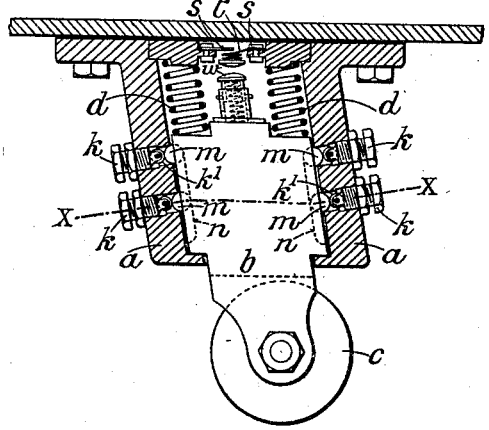
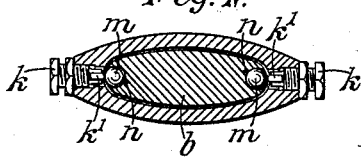
Witnesses
Inventor
Henry J. Jefcoate No. 722,109. PATENTED MAR. 3, 1903.
H. J. JEFCOATE.
RAILWAY SIGNALING APPARATUS.
APPLICATION FILED NOV. 24, 1902.
NO MODEL. 3 SHEETS—SHEET 3.

Witnesses

Inventor
Henry J. Jefcoate
by James L. Norris
atty

UNITED STATES PATENT OFFICE.

HENRY J. JEFCOATE, OF CREWE, ENGLAND.

RAILWAY SIGNALING APPARATUS.

SPECIFICATION forming part of Letters Patent No. 722,109, dated March 3, 1903.

Application filed November 24, 1902. Serial No. 132,644. (No model.)

*To all whom it may concern:*

Be it known that I, HENRY JAMES JEFCOATE, a subject of the King of Great Britain, residing at Crewe, in the county of Chester, England, have invented certain new and useful Improvements in Railway Signaling Apparatus, of which the following is a specification.

This invention relates to improvements in railway signaling apparatus, and is intended to provide in the place of or supplementary to the usual semaphore-arm or like local signal simple, reliable, and convenient means whereby a set of signaling instruments placed in the cab of an engine is controlled from a signal-cabin having charge of the section of the line in which the engine is traveling. I arrange my apparatus to give either audible or visible signals or both audible and visible signals. Thus my improved apparatus can be used with great advantage in foggy weather or in tunnels, where the signal-lights are liable to be obscured by clouds of vapor, smoke, or the like, and the employment of detonating signals can thereby be dispensed with. In clear weather my improved apparatus acts to check or give warning of errors of observation on the part of an engine-driver as to the position of a semaphore-arm or the color of a signal-light.

In carrying my said invention into practice I provide a set of bells or the like or of indicators for conveying either audible or visible signals or a combination of bells or the like and indicators to convey both audible and visible signals, arranged in a suitable position within the cab of the engine, so that they can attract the attention of the engine-driver or can be readily observed by him whenever they are actuated for the purpose of conveying a signal or order. Each visible indicator, together with the corresponding audible indicator, is controlled by a suitable electrical circuit connected with a battery or other source of electrical energy, and each circuit includes a circuit-breaker or switch, which is normally held in the open position, but which can be closed by the movement of a plunger in a casing or by like means. Said plungers project beyond the frame of the engine and are preferably provided at their exterior ends with antifriction rollers or wheels supported slightly higher than the level of the rails forming the track, but at varying distances measured laterally from one of the said track-rails, preferably the outer rail.

In suitable positions slightly-inclined striking-bars so mounted on pivoted supports that they can be raised and lowered are arranged parallel to the track-rails and at suitable distances therefrom, so that when one or other of the said bars is raised it will lie in the path of the corresponding antifriction roller or wheel on the plunger projecting from the engine and raise said wheel, which thereupon, acting through its plunger, closes the corresponding circuit and actuates that particular member or members of the indicating instrument mounted within the cab of the engine which is included in said circuit.

Figure 5:
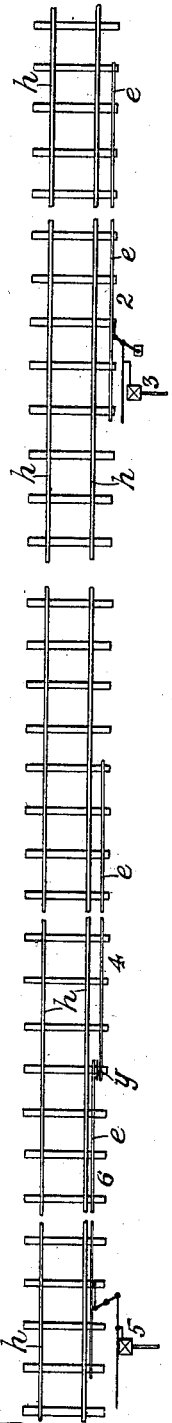
Figure 6:
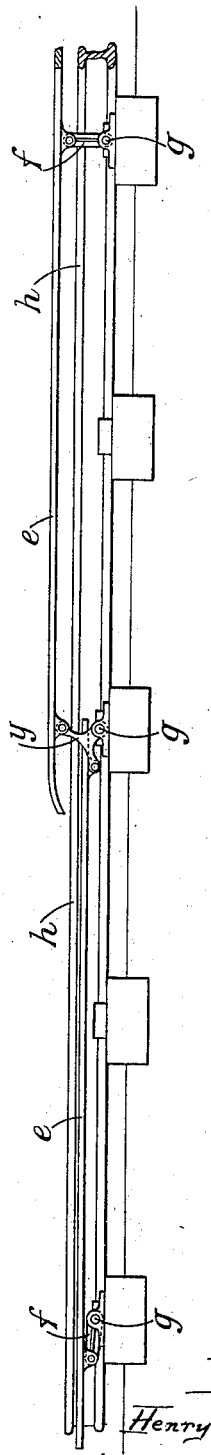

Referring to the accompanying drawings, Figure 1 is a diagrammatic view of a locomotive-engine and track-rails, showing my invention applied thereto. Fig. 2 is an end elevation, on a larger scale, of three plunger-casings, showing one of said plungers raised by the contact of its roller with a striking-bar. Fig. 3 is a side view in central section, and Fig. 4 is a sectional plan taken on the line X X, Fig. 3, of a plunger-casing and its appurtenant parts. Fig. 5 is a diagrammatic plan view of a length of track, showing an arrangement of striking-bars relatively thereto. Fig. 6 is a side view illustrating a method of coupling together the adjoining ends of two striking-bars.

$a$ $a$ $a$ are casings which for the purposes of my invention may be conveniently mounted beneath the lowermost of the steps leading to the cab of the locomotive-engine. A plunger $b$, having a forked end wherein a roller $c$ can be rotatably mounted, is axially movable in each casing and is constantly pressed outwardly by a spring or springs $d$.

Striking-bars $e$, mounted on links $f$, turning about horizontal pivots $g$, so that the said bars can be raised and lowered, are arranged parallel to the track-rails $h$ and at suitable distances therefrom measured laterally, so that when a bar $e$ is in the raised position the said bar lies in the path of the corresponding roller $c$. The upper surface of each striking-bar is slightly inclined, so that the roller $c$ when it comes in contact with the bar will roll along it and be raised gradually, thus pressing the plunger into the cylinder against the action of the spring $d$.

The raising or lowering of the striking-bars $e$ can be effected in any convenient manner—for example, by means similar to those at present employed for raising or lowering semaphore-arms, such arrangements being controlled by existing levers arranged in a signal-cabin.

In order to reduce the friction opposing the movement of the plunger $b$ in the casing $a$, tapped holes are formed in the casing-wall in convenient situations, as shown in Figs. 3 and 4, to receive screw-threaded bolts $k$, formed with forked ends to receive rollers $k'$ to back up or support bearing-balls $m$, projecting into grooves $n$, formed in the plunger parallel to the longitudinal axis thereof. Suitable mechanism operated from the cab of the engine may be provided to raise the plungers when their use is to be dispensed with—for example, when the engine is traveling in the "up" direction of the "down line."

As shown in Fig. 1, I employ three visible signals $p' p^2 p^3$, which respectively correspond to the signals or messages "distance signal on," "home signal on," "line clear," and in addition I provide two bells or audible signals, one of them—viz., $p^4$—serving the double purpose of indicating "distance signal on" and "home signal on," and the other bell or audible signal, $p^5$, having a distinctive tone serving to indicate "line clear." The said bells and indicators are mounted in the cab of the engine in a position to be easily observed by the driver and are included in the desired manner in separate electrical circuits each of which passes through a switch comprising terminals $s\ s$, Fig. 3, and a bridge-piece $t$, which is normally held in the open position by a spring.

The rising of the plunger $b$ in the casing $a$, as above described, brings the telescopic pusher $w$ into contact with the spring-controlled bridge-piece $t$, thereby closing the circuit through the terminals $s\ s$ to actuate the bell or other indicator.

As shown in Fig. 5, I arrange the striking-bars with relation to the track as follows, viz: one striking-bar 2 near each distant signal 3, a second bar 4 in front of each home signal 5, and a third bar 6 arranged as a continuation of the bar 4, the said bar 6 extending as far as the home signal.

In operation if the signals have been pulled down to "line clear" the "signal-on" striking-bars 2 and 4 are in the lower position and the indicating instrument in the cab remains unaffected by them, but will indicate "line clear" as each home signal 5 is passed. Now supposing the signalman has not received the "line-clear" signal from the next section ahead, the distant and home signals are set "on," with their striking-bars 2 4 raised and the "line-clear" striking-bar 6 lowered. The engine-driver on passing the distant signal will now receive the message "distant signal on" and prepare to stop his engine. On reaching the home signal 5, if in the meantime this signal has been changed to "line clear," the "signal-on" striking-bar 4 will be lowered and the "line-clear" striking-bar 6 will be raised, so that a corresponding indication will be made by the instrument in the cab; but if the line is blocked the "home signal on" will be given to the driver, who will then bring his engine to rest just in front of the home signal over the "line-clear" striking-bar. When the latter is raised, the corresponding indication will be made by the instrument in the cab and the driver will be free to proceed.

My improved apparatus will operate equally as well when the engine is at rest as when the engine is traveling at any speed of which it is capable.

I prefer to couple together the adjacent ends of the bars 4 and 6, above referred to, in such a manner as to insure that when one is raised the other must be depressed. This is accomplished by pivoting the adjacent ends of the two series to a swinging link $y$, (illustrated in Fig. 6,) besides which this connection serves to balance the bars so as to lessen the stress of the "pull over" for the signalman.

If desired, the duplicate signaling instrument can be placed in the guards-van, which instrument may be operated in a similar manner to that in the cab of the engine.

My improved system provides a complete and safe mode of signaling, while dispensing entirely with the use of detonators.

What I claim is—

1. The combination with a section of railway-track, of "home" and "distant" semaphore-signals, three pivotally-mounted striking-bars having one end turned downwardly and arranged parallel to the track-rails at different distances laterally therefrom for working signals in the cab of the engine, connecting means between said signals and the striking-bars, said striking-bars being arranged one near the "distant" semaphore-signal, a second bar in front of the "home" semaphore-signal, and a third bar extending from the second bar to the "home" semaphore-signal, the second bar being lowered when the third bar is raised, and raised when the third bar is lowered, and means for raising and lowering the first inclined bar by the "distant" semaphore-signal-actuating apparatus, and for actuating the second and third inclined bars by the "home" semaphore-signal-actuating apparatus, substantially as described.

2. The combination with a section of railway-track of "home" and "distant" semaphore-signals, three pivoted striking-bars having one end turned downwardly and arranged parallel to the track-rails at different distances laterally therefrom for working visible and audible signals in the cab of a locomotive, the first of said bars being arranged near the "distant" semaphore-signal, the second bar being in front of the "home" semaphore-signal, and the third bar extending from the second bar to the "home" semaphore-signal, means for raising the first bar when the "distant" semaphore-signal is moved to the "on" position and for lowering it when the said signal is taken off, means for raising the second bar and lowering the third bar when the "home" semaphore-signal is moved to the "on" position and for lowering the second bar and raising the third bar when the said "home" signal is taken off, audible and visible signals in the cab of the locomotive, and three sliding plungers on the locomotive forming connections between the said inclined bars respectively and the said corresponding audible and visible signals, substantially as described.

In testimony whereof I have hereunto set my hand in presence of two subscribing witnesses.

HENRY J. JEFCOATE.

Witnesses:
 ROBT. R. EDLESTON,
 W. J. HURSTFIELD.